United States Patent
Tachibanada

(10) Patent No.: US 10,527,113 B2
(45) Date of Patent: Jan. 7, 2020

(54) HYDRAULIC CIRCUIT DEVICE AND LINE PRESSURE BOOSTING METHOD FOR HYDRAULIC CIRCUIT

(71) Applicant: HONDA MOTOR CO., LTD., Tokyo (JP)

(72) Inventor: Yuya Tachibanada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 7 days.

(21) Appl. No.: 15/915,063

(22) Filed: Mar. 8, 2018

(65) Prior Publication Data
US 2018/0283477 A1 Oct. 4, 2018

(30) Foreign Application Priority Data
Mar. 29, 2017 (JP) ................................. 2017-065647

(51) Int. Cl.
*F16H 61/02* (2006.01)
*F16D 48/06* (2006.01)
(Continued)

(52) U.S. Cl.
CPC .............. *F16D 48/066* (2013.01); *B60K 6/12* (2013.01); *F15B 1/022* (2013.01); *F15B 1/027* (2013.01); *F16H 61/0025* (2013.01); *F16H 61/0206* (2013.01); *F16H 63/46* (2013.01); *B60K 2006/126* (2013.01); *F02N 7/00* (2013.01); *F16D 2500/1026* (2013.01);
(Continued)

(58) Field of Classification Search
None
See application file for complete search history.

(56) References Cited

U.S. PATENT DOCUMENTS

| | | | | |
|---|---|---|---|---|
| 8,734,293 B1* | 5/2014 | Perkarsky | ........... | F16H 61/0021 477/115 |
| 2009/0247353 A1* | 10/2009 | Tryon | ................. | F16H 61/0031 477/20 |
| 2016/0341311 A1* | 11/2016 | Watanabe | ........... | F16H 63/3483 |

FOREIGN PATENT DOCUMENTS

| | | |
|---|---|---|
| JP | 3807145 B2 | 11/2000 |
| JP | 2012-145117 | 8/2012 |

OTHER PUBLICATIONS

Japanese Office Action for corresponding JP Application No. 2017-065647, dated Jan. 8, 2019 (w/ English machine translation).

* cited by examiner

*Primary Examiner* — Justin Holmes
(74) *Attorney, Agent, or Firm* — Mori & Ward, LLP

(57) ABSTRACT

A hydraulic circuit device for a vehicle, includes a clutch, a flow path, a fluid pump, a pressure generating device, and a control valve. The control valve is configured to determine whether a transmission start-stop function activation condition other than a vehicle speed is satisfied, determine whether a system start-stop function activation condition related to a component of the vehicle is satisfied, the component being other than the transmission, determine whether the vehicle speed is equal to or lower than a first speed threshold, and boost a line pressure of the flow path to accumulate pressure in the pressure generating device for preparing activation of the start-stop function if it is determined that the transmission start-stop function activation condition and the system start-stop function activation condition are satisfied, and if it is determined that the vehicle speed is equal to or lower than the first speed threshold.

13 Claims, 3 Drawing Sheets

(51) Int. Cl.
*F15B 1/02*      (2006.01)
*F15B 1/027*     (2006.01)
*F16H 63/46*     (2006.01)
*F16H 61/00*     (2006.01)
*B60K 6/12*      (2006.01)
*F02N 7/00*      (2006.01)

(52) U.S. Cl.
CPC ............ *F16D 2500/10412* (2013.01); *F16D 2500/1107* (2013.01); *F16D 2500/3108* (2013.01); *F16H 2061/0034* (2013.01); *F16H 2312/14* (2013.01)

HYDRAULIC CIRCUIT DEVICE AND LINE PRESSURE BOOSTING METHOD FOR HYDRAULIC CIRCUIT

CROSS-REFERENCE TO RELATED APPLICATIONS

The present application claims priority under 35 U.S.C. § 119 to Japanese Patent Application No. 2017-065647, filed Mar. 29, 2017, entitled "Hydraulic Circuit Device and Line Pressure Boosting Method for Hydraulic Circuit." The contents of this application are incorporated herein by reference in their entirety.

BACKGROUND

1. Field

The present disclosure relates to a hydraulic circuit device and a line pressure boosting method for a hydraulic circuit.

2. Description of the Related Art

In the related art, a hydraulic circuit device as follows is available (see, for example, Japanese Patent No. 3807145). When a vehicle starts while a start-stop function is active, even if hydraulic pressure from a hydraulic pump is not applied because an internal combustion engine stops while the start-stop function is active, the hydraulic circuit device brings a hydraulic clutch into engagement using hydraulic pressure accumulated in an accumulator of a hydraulic circuit to thereby make the vehicle start immediately after restart of the internal combustion engine.

SUMMARY

According to one aspect of the present invention, a hydraulic circuit device for a vehicle includes a clutch, a flow path, a fluid pump, a pressure generating device, and a control valve. The clutch is to activate a start-stop function of the vehicle. The flow path is connected to the clutch. The fluid pump is connected to the flow path to supply oil to the flow path. The pressure generating device is connected to the flow path to supply oil to the flow path when the fluid pump does not function. The control valve is connected to the flow path. The control valve is configured to determine whether a transmission start-stop function activation condition other than a vehicle speed is satisfied. The control valve is configured to determine whether a system start-stop function activation condition related to a component of the vehicle is satisfied. The component is other than the transmission. The control valve is configured to determine whether the vehicle speed is equal to or lower than a first speed threshold. The control valve is configured to boost a line pressure of the flow path to accumulate pressure in the pressure generating device for preparing activation of the start-stop function if it is determined that the transmission start-stop function activation condition and the system start-stop function activation condition are satisfied, and if it is determined that the vehicle speed is equal to or lower than the first speed threshold.

According to another aspect of the present invention, a hydraulic circuit device for a vehicle includes a clutch, a flow path, a fluid pump, a pressure generating device, and a control valve. The clutch is to activate a start-stop function of the vehicle. The flow path is connected to the clutch. The fluid pump is connected to the flow path to supply oil to the flow path. The pressure generating device is connected to the flow path to supply oil to the flow path when the fluid pump does not function. The control valve is connected to the flow path. The control valve is configured to determine whether a transmission start-stop function activation condition other than a vehicle speed is satisfied. The control valve is configured to determine whether a system start-stop function activation condition related to a component of the vehicle is satisfied. The component is other than the transmission. The control valve is configured to determine whether a second vehicle speed condition in which the vehicle speed increases to be larger than a second speed threshold before a first predetermined time elapses is satisfied. The second speed threshold is higher than a first speed threshold. The control valve is configured to determine whether a first disablement condition in which the vehicle speed decreases to be less than or equal to the first speed threshold while the line pressure is boosted and a first predetermined time elapses is satisfied. The control valve is configured to determine whether a second disablement condition in which the vehicle stops and a second predetermined period elapses is satisfied. The control valve is configured to stop boosting a line pressure of the flow path to accumulate pressure in the pressure generating device for preparing for activation of the start-stop function if it is determined that the transmission start-stop function activation condition and the system start-stop function activation condition are satisfied, and if it is determined that at least one of the second vehicle speed condition, the first disablement condition, and the second disablement condition is satisfied.

According to further aspect of the present invention, a hydraulic circuit device for a vehicle includes a clutch, a flow path, a fluid pump, a pressure generating device, and a control valve. The clutch is to activate a start-stop function of the vehicle. The flow path is connected to the clutch. The fluid pump is connected to the flow path to supply oil to the flow path. The pressure generating device is connected to the flow path to supply oil to the flow path when the fluid pump does not function. The control valve is connected to the flow path. The control valve is configured to determine whether a transmission start-stop function activation condition other than a vehicle speed is satisfied. The control valve is configured to determine whether a system start-stop function activation condition related to a component of the vehicle is satisfied. The component being other than the transmission. The control valve is configured to determine whether a first vehicle speed condition in which the vehicle speed is equal to or lower than a first speed threshold is satisfied. The control valve is configured to stop boosting a line pressure of the flow path to accumulate pressure in the pressure generating device for preparing for activation of the start-stop function if it is determined that at least one of the transmission start-stop function activation condition, the system start-stop function activation condition, and the first vehicle speed condition is not satisfied.

According to further aspect of the present invention, a line pressure boosting method for a hydraulic circuit in a vehicle includes determining whether a transmission start-stop function activation condition other than a vehicle speed is satisfied. Whether a system start-stop function activation condition related to a component of the vehicle is satisfied is determined. The component is other than the transmission. Whether the vehicle speed is equal to or lower than a first speed threshold is determined. A line pressure of the hydraulic circuit is boosted to accumulate pressure in a pressure generating device for preparing activation of a start-stop function of the vehicle if it is determined that the transmission start-stop function activation condition and the system start-stop function activation condition are satisfied, and if it is determined that the vehicle speed is equal to or lower than the first speed threshold.

According to further aspect of the present invention, a line pressure boosting method for a hydraulic circuit in a vehicle includes determining whether a transmission start-stop function activation condition other than a vehicle speed is satisfied. Whether a system start-stop function activation condition related to a component of the vehicle is satisfied is determined. The component is other than the transmission. Whether a second vehicle speed condition in which the vehicle speed increases to be larger than a second speed threshold before a first predetermined time elapses is satisfied is determined. The second speed threshold is higher than a first speed threshold. Whether a first disablement condition in which the vehicle speed decreases to be less than or equal to the first speed threshold while the line pressure is boosted and a first predetermined time elapses is satisfied is determined. Whether a second disablement condition in which the vehicle stops and a second predetermined period elapses is satisfied is determined. Boosting a line pressure of the hydraulic circuit to accumulate pressure in a pressure generating device for preparing activation of a start-stop function of the vehicle is stopped, if it is determined that the transmission start-stop function activation condition and the system start-stop function activation condition are satisfied, and if it is determined that at least one of the second vehicle speed condition, the first disablement condition, and the second disablement condition is satisfied.

According to further aspect of the present invention, a line pressure boosting method for a hydraulic circuit in a vehicle includes determining whether a transmission start-stop function activation condition other than a vehicle speed is satisfied. Whether a system start-stop function activation condition related to a component of the vehicle is satisfied is determined. The component is other than the transmission. Whether a first vehicle speed condition in which the vehicle speed is equal to or lower than a first speed threshold is satisfied is determined. Boosting a line pressure of the hydraulic circuit to accumulate pressure in a pressure generating device for preparing activation of a start-stop function of the vehicle is stopped if it is determined that at least one of the transmission start-stop function activation condition, the system start-stop function activation condition, and the first vehicle speed condition is not satisfied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
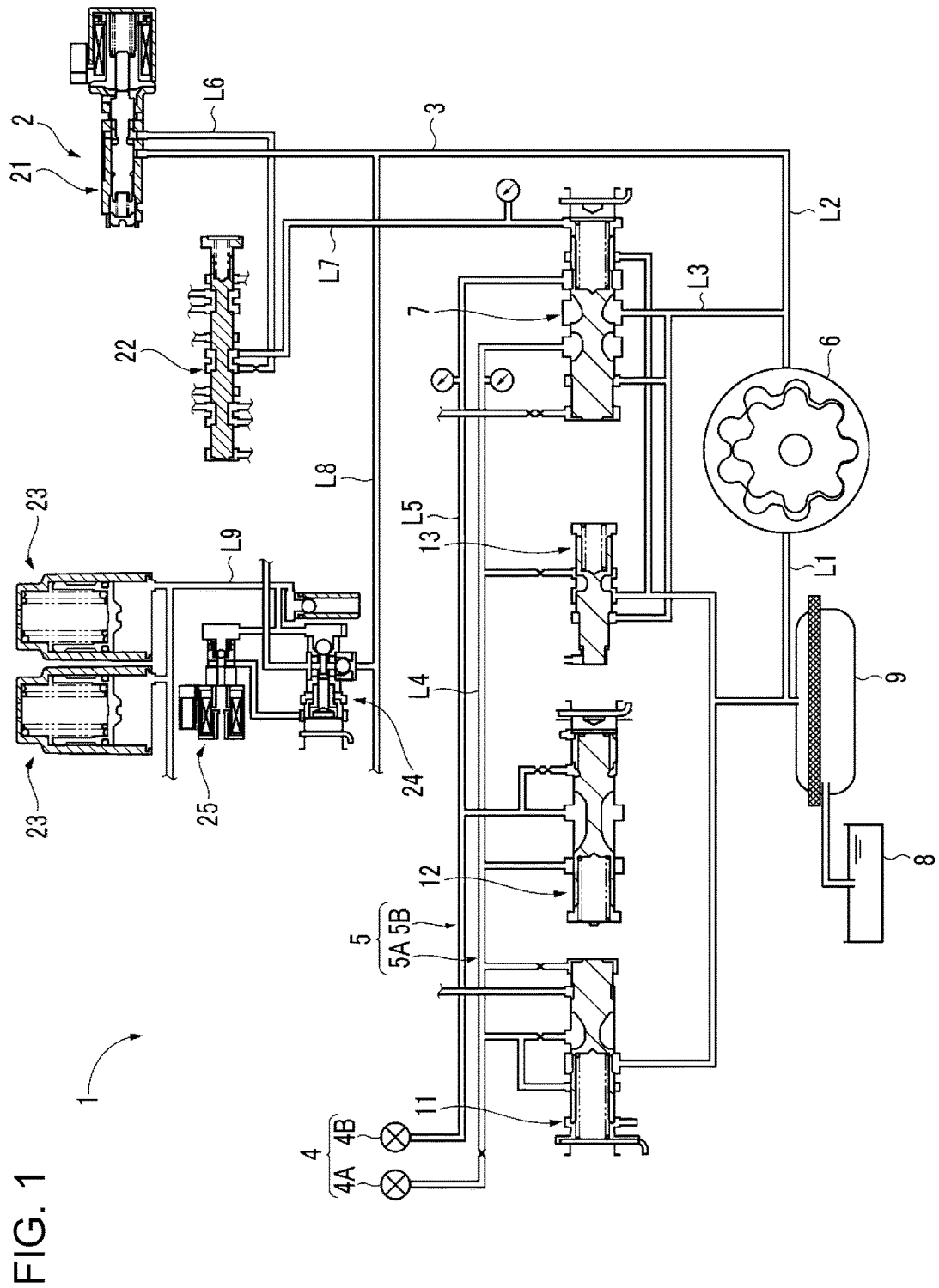
FIG. 1 is a schematic diagram illustrating a hydraulic circuit device according to an embodiment of the present disclosure.

The embodiments will now be described with reference to the accompanying drawings, wherein like reference numerals designate corresponding or identical elements throughout the various drawings.

Hereinafter, a hydraulic circuit device 1 according to an embodiment of the present disclosure is described in detail with reference to the drawings. As illustrated in FIG. 1, the hydraulic circuit device 1 according to this embodiment is a device that supplies a fluid to a power transmission device mounted in a vehicle (car), and includes an operating circuit 3, a lubricating circuit 5, a fluid pump 6, and a main control valve 7. The operating circuit 3 is used to supply a fluid to an operating unit 2, which is, for example, a friction clutch included in the power transmission device. The lubricating circuit 5 is used to supply a fluid to a lubricating unit 4, which is constituted by, for example, components of the operating unit 2. The fluid pump (hereinafter referred to as "hydraulic pump") 6 uses power of a driving source (an internal combustion engine or a motor) to convey a fluid. The main control valve 7 controls the flow rate of a fluid flowing from the hydraulic pump 6 to the lubricating circuit 5 to thereby control the fluid pressure in the operating circuit 3. Hereinafter, the fluid flowing through the operating circuit 3 is referred to as a hydraulic oil, and the fluid flowing through the lubricating circuit 5 is referred to as a lubricating oil.

The lubricating unit 4 is constituted by a first lubricating unit 4A and a second lubricating unit 4B. The first lubricating unit 4A includes the friction clutch and other components. The second lubricating unit 4B includes, for example, a differential gear of the power transmission device. The lubricating circuit 5 is constituted by a first lubricating circuit 5A and a second lubricating circuit 5B. The first lubricating circuit 5A is used to direct the lubricating oil to, for example, the friction clutch constituting the first lubricating unit 4A via, for example, a main shaft. The second lubricating circuit 5B is used to supply the lubricating oil subjected to temperature regulation by an oil warmer to, for example, the differential gear constituting the second lubricating unit 4B.

The hydraulic circuit device 1 further includes an oil pan 8, a strainer 9, a first flow path L1, a second flow path L2, a third flow path L3, a fourth flow path L4, and a fifth flow path L5. The oil pan 8 stores the lubricating oil (hydraulic oil) flowing through the circuits. The strainer 9 removes foreign objects from the lubricating oil flowing from the oil pan 8. The first flow path L1 is used to direct the lubricating oil from the strainer 9 to the hydraulic pump 6. The second flow path L2 is used to direct the lubricating oil conveyed from the hydraulic pump 6 to the operating circuit 3. The third flow path L3 is a branch extending from the second flow path L2 and connected to the main control valve 7. The fourth flow path L4 is used to direct the lubricating oil from the main control valve 7 to the first lubricating circuit 5A. The fifth flow path L5 is used to direct the lubricating oil from the main control valve 7 to the second lubricating circuit 5B.

The hydraulic pump 6 sucks the lubricating oil stored in the oil pan 8 via the strainer 9 and the first flow path L1 and conveys the lubricating oil to the second flow path L2. The lubricating oil directed from the second flow path L2 to the third flow path L3 is conveyed to the fourth flow path L4 and to the fifth flow path L5 when the main control valve 7 opens.

The lubricating circuit 5 includes a first lubricating pressure regulating valve 11, a second lubricating pressure regulating valve 12, and a low-pressure fluid exhaust valve 13. The first lubricating pressure regulating valve 11 releases the lubricating oil in the fourth flow path L4 to the first flow path L1 when the pressure of the lubricating oil in the fourth flow path L4 becomes a predetermined pressure or higher.

The second lubricating pressure regulating valve 12 releases the lubricating oil in the fifth flow path L5 to the fourth flow path L4 when the pressure of the lubricating oil in the fifth flow path L5 becomes higher than the pressure of the lubricating oil in the fourth flow path L4 by a predetermined pressure or more. The low-pressure fluid exhaust valve 13 shuts off the flow of the lubricating oil from the fourth flow path L4 to the first flow path L1 when the pressure of the lubricating oil in the third flow path L3 becomes a predetermined pressure or higher.

The operating circuit 3 includes a pressure regulator 21, a sixth flow path L6, a shut-off valve 22, and a seventh flow path L7. The pressure regulator 21 is connected to the second flow path L2 and operates for forcibly increasing the line pressure. The sixth flow path L6 is used to direct the hydraulic oil from the pressure regulator 21. The shut-off valve 22 is connected to the sixth flow path L6 and shuts off the pressure of the hydraulic oil from the pressure regulator 21. The seventh flow path L7 is used to direct the hydraulic oil from the shut-off valve 22 to the main control valve 7.

When the pressure regulator 21, which is an electromagnetic valve, is operated, part of the hydraulic oil is directed to the main control valve 7 via the sixth flow path L6, the shut-off valve 22, and the seventh flow path L7. At the main control valve 7, the lubricating oil to be directed to the lubricating circuit 5 is held to thereby increase the fluid pressure in the operating circuit 3.

The operating circuit 3 includes two accumulators 23 (pressure generating devices 23), an accumulator on/off valve 24, and a restart on/off valve 25. The accumulators 23 accumulate the hydraulic oil. The accumulator on/off valve 24 directs part of the hydraulic oil to the accumulators 23 in a switchable manner. The restart on/off valve 25 is a normally closed valve that opens the accumulator on/off valve 24. The accumulators 23 use the hydraulic oil stored in the accumulators 23 and supply the hydraulic oil to the operating circuit 3 to boost the line pressure in a case where the line pressure is not boosted because, for example, the internal combustion engine does not operate and the hydraulic pump 6 does not function accordingly. The accumulator on/off valve 24 is connected to an eighth flow path L8, which is a branch extending from the second flow path L2, and used to direct part of the hydraulic oil to the accumulators 23 via a ninth flow path L9.

When a start-stop function is active, the hydraulic oil accumulated in the accumulators 23 is to return to the accumulator on/off valve 24 and to the restart on/off valve 25. The hydraulic pressure to be reapplied to the eighth flow path L8 is stopped by check valves provided in the accumulator on/off valve 24 and the restart on/off valve 25.

When the internal combustion engine is started to prepare for restart of the vehicle while the start-stop function is active, the restart on/off valve 25 is opened, the hydraulic pressure accumulated in the accumulators 23 is applied to one end of the accumulator on/off valve 24 via the ninth flow path L9 and the restart on/off valve 25, the check valve of the accumulator on/off valve 24 is disabled, and the hydraulic pressure accumulated in the accumulators 23 is applied. Accordingly, the hydraulic pressure accumulated in the accumulators 23 is used to bring a hydraulic clutch into engagement to enable immediate start after restart of the internal combustion engine.

Figure 2:
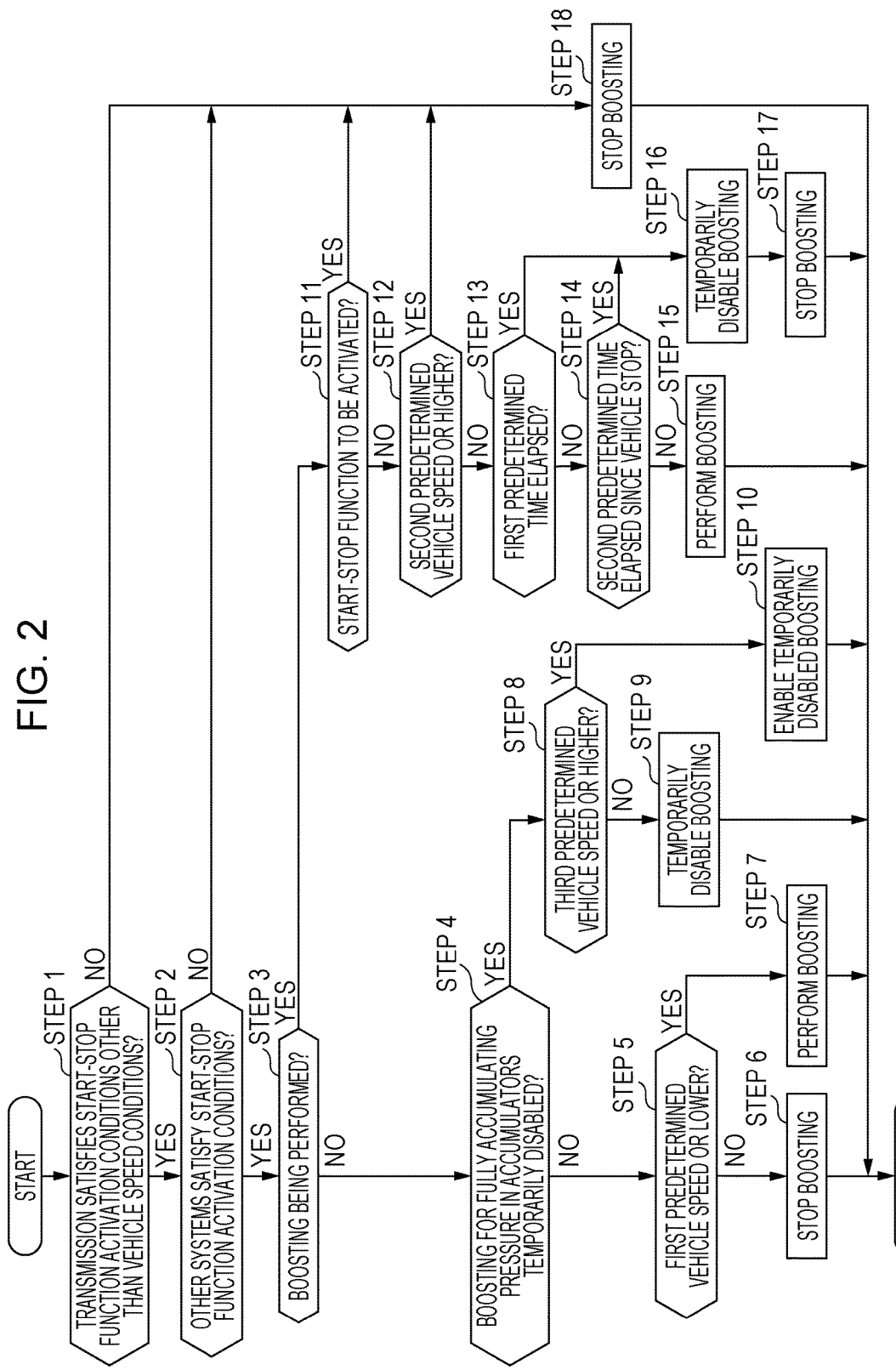
FIG. 2 is a flowchart illustrating a line pressure boosting method for a hydraulic circuit performed by the hydraulic circuit device according to the embodiment.

Now, an example operation of the hydraulic circuit device 1 (a line pressure boosting method for the hydraulic circuit) according to this embodiment is described with reference to the flowchart in FIG. 2. The hydraulic circuit device 1 according to this embodiment repeatedly performs the flow in FIG. 2 in accordance with a predetermined control cycle (for example, every 10 msec).

In STEP 1, it is determined whether the transmission satisfies start-stop function activation conditions (a transmission start-stop activation condition; for example, whether the hydraulic oil temperature is within a predetermined range, whether the transmission fails, and so on) other than vehicle speed conditions (transmission condition determination step). If the transmission does not satisfy the start-stop function activation conditions (No in STEP 1), the flow proceeds to STEP 18. In STEP 18, boosting of the line pressure for fully accumulating pressure in the accumulators 23 is stopped. Then, the present process ends. If the transmission satisfies the start-stop function activation conditions (Yes in STEP 1), the flow proceeds to STEP 2.

In STEP 2, it is determined whether systems (for example, the engine and so on) other than the transmission satisfy the start-stop function activation conditions (a system start-stop function activation condition) (system condition determination step). If systems other than the transmission do not satisfy the start-stop function activation conditions (No in STEP 2), the flow proceeds to STEP 18. In STEP 18, boosting of the line pressure for fully accumulating pressure in the accumulators 23 is stopped. Then, the present process ends. If systems other than the transmission satisfy the start-stop function activation conditions (Yes in STEP 2), the flow proceeds to STEP 3.

In STEP 3, it is determined whether boosting of the line pressure is being performed (boosting determination step). If boosting of the line pressure is being performed (Yes in STEP 3), the flow proceeds to STEP 11. If boosting of the line pressure is not being performed (No in STEP 3), the flow proceeds to STEP 4.

In STEP 4, it is determined whether boosting of the line pressure performed for start-stop function activation is temporarily disabled because the start-stop function is not actually activated (boosting temporary-disablement determination step). If boosting is temporarily disabled because the start-stop function is not actually activated (Yes in STEP 4), the flow proceeds to STEP 8. If boosting is not temporarily disabled because the start-stop function is actually activated (No in STEP 4), the flow proceeds to STEP 5.

In STEP 5, it is determined whether the vehicle speed is equal to or lower than a first predetermined vehicle speed (a first speed threshold; for example, 1 km/h) (a first vehicle speed condition) (first predetermined vehicle speed condition determination step). If the vehicle speed is higher than the first predetermined vehicle speed (No in STEP 5), the flow proceeds to STEP 6. In STEP 6, boosting of the line pressure for fully accumulating pressure in the accumulators 23 is stopped. Then, the present process ends. If the vehicle speed is equal to or lower than the first predetermined vehicle speed (Yes in STEP 5), the flow proceeds to STEP 7. In STEP 7, boosting of the line pressure for fully accumulating pressure in the accumulators 23 is performed, and a timer for measuring a first predetermined time is turned on. Then, the process ends.

In STEP 4, if boosting is temporarily disabled because the start-stop function is not actually activated (Yes in STEP 4), the flow proceeds to STEP 8. In STEP 8, it is determined whether the vehicle speed is equal to or higher than a third predetermined vehicle speed (for example, 2 km/h) (third predetermined vehicle speed condition determination step). If the vehicle speed is lower than the third predetermined vehicle speed (No in STEP 8), the flow proceeds to STEP 9. In STEP 9, boosting for fully accumulating pressure in the accumulators 23 is kept temporarily disabled. Then, the process ends. If the vehicle speed is equal to or higher than the third predetermined vehicle speed (Yes in STEP 8), the flow proceeds to STEP 10. In STEP 10, temporarily disabled boosting for fully accumulating pressure in the accumulators 23 is enabled. Then, the process ends (at this time point, boosting does not start).

In STEP 3, if boosting is being performed (Yes in STEP 3), the flow proceeds to STEP 11. In STEP 11, it is determined whether the start-stop function is to be activated (start-stop function activation determination step). If the start-stop function is to be activated (Yes in STEP 11), the flow proceeds to STEP 18. In STEP 18, boosting of the line pressure for fully accumulating pressure in the accumulators 23 is stopped. Then, the present process ends. If the start-stop function is not to be activated (No in STEP 11), the flow proceeds to STEP 12.

In STEP 12, it is determined whether the vehicle speed increases to a second predetermined vehicle speed (a second speed threshold; for example, 2 km/h) or higher before the first predetermined time elapses (a second vehicle speed condition) (second predetermined vehicle speed condition determination step). If the vehicle speed increases to the second predetermined vehicle speed or higher (Yes in STEP 12), the flow proceeds to STEP 18. In STEP 18, boosting of the line pressure for fully accumulating pressure in the accumulators 23 is stopped. Then, the present process ends. If the vehicle speed does not increase to the second predetermined vehicle speed or higher (No in STEP 12), the flow proceeds to STEP 13.

In STEP 13, it is determined whether the vehicle speed decreases to the first predetermined vehicle speed or lower after the start of boosting of the line pressure and the first predetermined time (for example, 10 sec.) elapses (a first disablement condition) (first disablement condition determination step). If the vehicle speed decreases to the first predetermined vehicle speed or lower and the first predetermined time elapses (Yes in STEP 13), the flow proceeds to STEP 16. In STEP 16, boosting for fully accumulating pressure in the accumulators 23 is temporarily disabled. Subsequently, in STEP 17, boosting of the line pressure for fully accumulating pressure in the accumulators 23 is stopped. Then, the present process ends. If the vehicle speed does not decrease to the first predetermined vehicle speed or lower or if the first predetermined time does not elapse (No in STEP 13), the flow proceeds to STEP 14.

In STEP 14, it is determined whether the vehicle stops (here, the vehicle speed may be 0 km/h or may be a sufficiently low speed so that it can be determined that the vehicle stops) and the time elapsed since the stop reaches a second predetermined time (for example, 5 sec.) (second disablement condition) (second disablement condition determination step). If the vehicle stops and the elapsed time reaches the second predetermined time (Yes in STEP 14), the flow proceeds to STEP 16. In STEP 16, boosting for fully accumulating pressure in the accumulators 23 is temporarily disabled. Subsequently, in STEP 17, boosting of the line pressure for fully accumulating pressure in the accumulators 23 is stopped. Then, the present process ends. If the vehicle does not stop or if the elapsed time does not reach the second predetermined time (No in STEP 14), the flow proceeds to STEP 15. In STEP 15, boosting of the line pressure for fully accumulating pressure in the accumulators 23 is performed. Then, the process ends.

As described above, in the line pressure boosting method for the hydraulic circuit, if the condition is satisfied in the transmission condition determination step, the condition is satisfied in the system condition determination step, and the condition is satisfied in the first predetermined vehicle speed condition determination step, boosting of the line pressure is performed. Therefore, it is possible to boost the line pressure before activation of the start-stop function to fully accumulate pressure in the accumulators, and to supply the maximum hydraulic pressure after deactivation of the start-stop function to immediately bring, for example, a clutch into engagement.

Further, in the line pressure boosting method for the hydraulic circuit, if the condition is satisfied in at least one of the second predetermined vehicle speed condition determination step, the first disablement condition determination step, and the second disablement condition determination step, boosting of the line pressure is stopped. Therefore, it is possible to suppress reduction in fuel economy due to the line pressure boosted more than necessary in preparation for activation of the start-stop function when the start-stop function is inactive, resulting in increased fuel economy.

Further, in the line pressure boosting method for the hydraulic circuit, if the condition is satisfied in the transmission condition determination step, the condition is satisfied in the system condition determination step, and the condition is not satisfied in the first predetermined vehicle speed condition determination step, or if the condition is not satisfied in at least one of the transmission condition determination step and the system condition determination step, boosting of the line pressure is stopped. Therefore, it is possible to suppress reduction in fuel economy due to the line pressure boosted more than necessary in preparation for activation of the start-stop function when the start-stop function is inactive.

Further, if the condition is not satisfied in the third predetermined vehicle speed condition determination step, boosting for fully accumulating pressure in the accumulators 23 is kept temporarily disabled, and the process ends. If the condition is satisfied in the third predetermined vehicle speed condition determination step, temporarily disabled boosting for fully accumulating pressure in the accumulators 23 is enabled, and the process ends. Therefore, it is possible to suppress reduction in fuel economy due to the line pressure boosted more than necessary in preparation for activation of the start-stop function.

Figure 3:
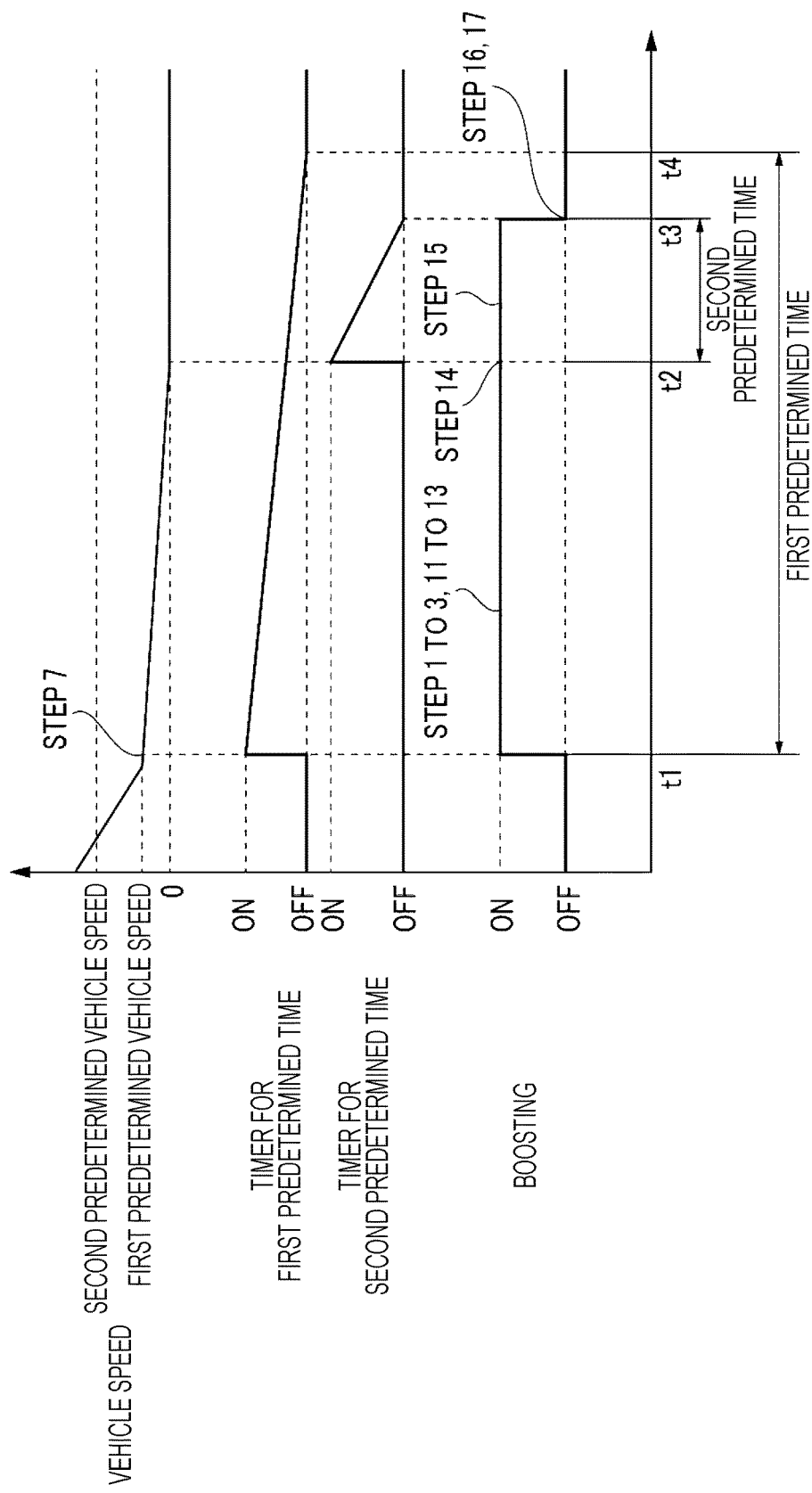
FIG. 3 is a timing chart illustrating an example of boosting of line pressure in the hydraulic circuit according to the embodiment.

FIG. 3 is a timing chart illustrating boosting of the line pressure in the hydraulic circuit. The horizontal axis represents time. The vertical axis represents, from the top to the bottom, the vehicle speed, on/off of the timer for measuring the first predetermined time, on/off of a timer for measuring the second predetermined time, and on/off of boosting for accumulating pressure in the accumulators.

When the vehicle speed decreases and reaches the first predetermined vehicle speed (for example, 1 km/h) at time t1, the timer for measuring the first predetermined time is turned on, and boosting of the line pressure for fully accumulating pressure in the accumulators 23 is performed (boosting ON).

When the vehicle speed reaches 0 km/h (the vehicle stops) at time t2, the timer for measuring the second predetermined time is turned on. At time t3 at which the second predetermined time (for example, 5 sec.) elapses, boosting for fully accumulating pressure in the accumulators 23 is temporarily disabled, and boosting is stopped (boosting OFF). At time t3, the first predetermined time (for example, 10 sec.) does not elapse. At time t4, the first predetermined time elapses.

During the period from time t1 to time t3, control is performed so as to perform boosting for fully accumulating pressure in the accumulators 23.

This control is described with reference to the flow in FIG. 2. At time t1, boosting in STEP 7 is performed and the timer for measuring the first predetermined time used in STEP 13 is turned on to start a time measurement process. Thereafter, in STEP 1 (transmission condition determination step), the transmission satisfies the start-stop function activation conditions other than the vehicle speed conditions (Yes in STEP 1), and therefore, the flow proceeds to STEP 2. In STEP 2 (system condition determination step), the other systems including the engine satisfy the start-stop function activation conditions (Yes in STEP 2), and therefore, the flow proceeds to STEP 3. In STEP 3, boosting is being performed (Yes in STEP 3), and therefore, the flow proceeds to STEP 11. In STEP 11 (start-stop function activation determination step), the start-stop function is not to be activated (No in STEP 11), and therefore, the flow proceeds to STEP 12. In STEP 12 (second predetermined vehicle speed condition determination step), the vehicle speed is lower than the second predetermined vehicle speed (No in STEP 12), and therefore, the flow proceeds to STEP 13. In STEP 13 (first disablement condition determination step), the first predetermined time does not elapse at a time point after time t1 and before time t2 (No in STEP 13), and therefore, the flow proceeds to STEP 14 (second disablement condition determination step). When the vehicle stops at time t2, the timer for measuring the second predetermined time is activated. When the second predetermined time elapses at time t3 (Yes in STEP 14), the flow proceeds to STEP 16. In STEP 16, boosting is temporarily disabled. In STEP 17, boosting is stopped. Then, the flow ends.

In this embodiment, the hydraulic circuit has the configuration as illustrated in FIG. 1; however, the configuration of the hydraulic circuit is not limited to that illustrated in FIG. 1. The hydraulic circuit may have any other configuration as long as the configuration implements a system in which a clutch is brought into engagement with pressure accumulated in an accumulator when the start-stop function is deactivated. Further, for example, the pressure regulator 21 and the restart on/off valve 25 are connected to a controller not illustrated, and the controller controls open/close of the valves.

[1] A hydraulic circuit device according to an aspect of the present disclosure is a hydraulic circuit device for boosting a line pressure to accumulate pressure in an accumulator in preparation for activation of a start-stop function in accordance with a plurality of conditions including a condition of a vehicle speed, the device performing a process including: a transmission condition determination step of determining whether a condition that a transmission satisfies a start-stop function activation condition other than the condition of the vehicle speed among the plurality of conditions is satisfied; a system condition determination step of determining whether a condition that a system other than the transmission satisfies the start-stop function activation condition is satisfied; and a first predetermined vehicle speed condition determination step of determining whether a condition that the vehicle speed is equal to or lower than a first predetermined vehicle speed is satisfied. If the condition is satisfied in the transmission condition determination step, the condition is satisfied in the system condition determination step, and the condition is satisfied in the first predetermined vehicle speed condition determination step, boosting of the line pressure is performed.

In the above-described hydraulic circuit device, if the condition is satisfied in the transmission condition determination step, the condition is satisfied in the system condition determination step, and the condition is satisfied in the first predetermined vehicle speed condition determination step, boosting of the line pressure is performed. Therefore, it is possible to boost the line pressure before activation of the start-stop function to fully accumulate pressure in the accumulator, and to supply the maximum hydraulic pressure after deactivation of the start-stop function to immediately bring, for example, a clutch into engagement.

[2] A hydraulic circuit device according to an aspect of the present disclosure is a hydraulic circuit device for boosting a line pressure to accumulate pressure in an accumulator in preparation for activation of a start-stop function in accordance with a plurality of conditions including a condition of a vehicle speed, the device performing a process including: a transmission condition determination step of determining whether a condition that a transmission satisfies a start-stop function activation condition other than the condition of the vehicle speed among the plurality of conditions is satisfied; a system condition determination step of determining whether a condition that a system other than the transmission satisfies the start-stop function activation condition is satisfied; a second predetermined vehicle speed condition determination step of determining whether a condition that the vehicle speed increases to a second predetermined vehicle speed or higher before a first predetermined time elapses is satisfied, the second predetermined vehicle speed being higher than a first predetermined vehicle speed; a first disablement condition determination step of determining whether a condition that the vehicle speed decreases to the first predetermined vehicle speed or lower while the line pressure is boosted and the first predetermined time elapses is satisfied; and a second disablement condition determination step of determining whether a condition that a vehicle stops and a second predetermined period elapses is satisfied. If the condition is satisfied in the transmission condition determination step and the condition is satisfied in the system condition determination step, and if the condition is satisfied in at least one of the second predetermined vehicle speed condition determination step, the first disablement condition determination step, and the second disablement condition determination step, boosting of the line pressure is stopped.

In the above-described hydraulic circuit device, if the condition is satisfied in at least one of the second predetermined vehicle speed condition determination step, the first disablement condition determination step, and the second disablement condition determination step, boosting of the line pressure is stopped. Therefore, it is possible to suppress reduction in fuel economy due to the line pressure boosted more than necessary in preparation for activation of the start-stop function when the start-stop function is inactive, resulting in increased fuel economy.

[3] A hydraulic circuit device according to an aspect of the present disclosure is a hydraulic circuit device for boosting a line pressure to accumulate pressure in an accumulator in preparation for activation of a start-stop function in accordance with a plurality of conditions including a condition of a vehicle speed, the device performing a process including: a transmission condition determination step of determining whether a condition that a transmission satisfies a start-stop function activation condition other than the condition of the vehicle speed among the plurality of conditions is satisfied; a system condition determination step of determining whether a condition that a system other than the transmission satisfies the start-stop function activation condition is satisfied; and a first predetermined vehicle speed condition determination step of determining whether a condition that the vehicle speed is equal to or lower than a first predetermined vehicle speed is satisfied. If the condition is satisfied in the transmission condition determination step, the condition is satisfied in the system condition determination step, and the condition is not satisfied in the first predetermined vehicle speed condition determination step, or if the condition is not satisfied in at least one of the transmission condition determination step and the system condition determination step, boosting of the line pressure is stopped.

In the above-described hydraulic circuit device, if the condition is satisfied in the transmission condition determination step, the condition is satisfied in the system condition determination step, and the condition is not satisfied in the first predetermined vehicle speed condition determination step, or if the condition is not satisfied in at least one of the transmission condition determination step and the system condition determination step, boosting of the line pressure is stopped. Therefore, it is possible to suppress reduction in fuel economy due to the line pressure boosted more than necessary in preparation for activation of the start-stop function when the start-stop function is inactive.

[4] A line pressure boosting method for a hydraulic circuit according to an aspect of the present disclosure is a line pressure boosting method for a hydraulic circuit for boosting a line pressure to accumulate pressure in an accumulator in preparation for activation of a start-stop function in accordance with a plurality of conditions including a condition of a vehicle speed, the method including: a transmission condition determination step of determining whether a condition that a transmission satisfies a start-stop function activation condition other than the condition of the vehicle speed among the plurality of conditions is satisfied; a system condition determination step of determining whether a condition that a system other than the transmission satisfies the start-stop function activation condition is satisfied; and a first predetermined vehicle speed condition determination step of determining whether a condition that the vehicle speed is equal to or lower than a first predetermined vehicle speed is satisfied. If the condition is satisfied in the transmission condition determination step, the condition is satisfied in the system condition determination step, and the condition is satisfied in the first predetermined vehicle speed condition determination step, boosting of the line pressure is performed.

In the above-described line pressure boosting method for a hydraulic circuit, if the condition is satisfied in the transmission condition determination step, the condition is satisfied in the system condition determination step, and the condition is satisfied in the first predetermined vehicle speed condition determination step, boosting of the line pressure is performed. Therefore, it is possible to boost the line pressure before activation of the start-stop function to fully accumulate pressure in the accumulator, and to supply the maximum hydraulic pressure after deactivation of the start-stop function to immediately bring, for example, a clutch into engagement.

[5] A line pressure boosting method for a hydraulic circuit according to an aspect of the present disclosure is a line pressure boosting method for a hydraulic circuit for boosting a line pressure to accumulate pressure in an accumulator in preparation for activation of a start-stop function in accordance with a plurality of conditions including a condition of a vehicle speed, the method including: a transmission condition determination step of determining whether a condition that a transmission satisfies a start-stop function activation condition other than the condition of the vehicle speed among the plurality of conditions is satisfied; a system condition determination step of determining whether a condition that a system other than the transmission satisfies the start-stop function activation condition is satisfied; a second predetermined vehicle speed condition determination step of determining whether a condition that the vehicle speed increases to a second predetermined vehicle speed or higher before a first predetermined time elapses is satisfied, the second predetermined vehicle speed being higher than a first predetermined vehicle speed; a first disablement condition determination step of determining whether a condition that the vehicle speed decreases to the first predetermined vehicle speed or lower while the line pressure is boosted and the first predetermined time elapses is satisfied; and a second disablement condition determination step of determining whether a condition that a vehicle stops and a second predetermined period elapses is satisfied. If the condition is satisfied in the transmission condition determination step and the condition is satisfied in the system condition determination step, and if the condition is satisfied in at least one of the second predetermined vehicle speed condition determination step, the first disablement condition determination step, and the second disablement condition determination step, boosting of the line pressure is stopped.

In the above-described line pressure boosting method for a hydraulic circuit, if the condition is satisfied in at least one of the second predetermined vehicle speed condition determination step, the first disablement condition determination step, and the second disablement condition determination step, boosting of the line pressure is stopped. Therefore, it is possible to suppress reduction in fuel economy due to the line pressure boosted more than necessary in preparation for activation of the start-stop function when the start-stop function is inactive, resulting in increased fuel economy.

[6] A line pressure boosting method for a hydraulic circuit according to an aspect of the present disclosure is a line pressure boosting method for a hydraulic circuit for boosting a line pressure to accumulate pressure in an accumulator in preparation for activation of a start-stop function in accordance with a plurality of conditions including a condition of a vehicle speed, the method including: a transmission condition determination step of determining whether a condition that a transmission satisfies a start-stop function activation condition other than the condition of the vehicle speed among the plurality of conditions is satisfied; a system condition determination step of determining whether a condition that a system other than the transmission satisfies the start-stop function activation condition is satisfied; and a first predetermined vehicle speed condition determination step of determining whether a condition that the vehicle speed is equal to or lower than a first predetermined vehicle speed is satisfied. If the condition is satisfied in the transmission condition determination step, the condition is satisfied in the system condition determination step, and the condition is not satisfied in the first predetermined vehicle speed condition determination step, or if the condition is not satisfied in at least one of the transmission condition determination step and the system condition determination step, boosting of the line pressure is stopped.

In the above-described line pressure boosting method for a hydraulic circuit, if the condition is satisfied in the transmission condition determination step, the condition is satisfied in the system condition determination step, and the condition is not satisfied in the first predetermined vehicle speed condition determination step, or if the condition is not satisfied in at least one of the transmission condition determination step and the system condition determination step, boosting of the line pressure is stopped. Therefore, it is possible to suppress reduction in fuel economy due to the line pressure boosted more than necessary in preparation for activation of the start-stop function when the start-stop function is inactive.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic circuit device for boosting a line pressure to accumulate pressure in an accumulator in preparation for activation of a start-stop function in accordance with a plurality of conditions including a condition of a vehicle speed, the device performing a process comprising:
    a transmission condition determination step of determining when a condition that a transmission satisfies a start-stop function activation condition other than the condition of the vehicle speed among the plurality of conditions is satisfied;
    a system condition determination step of determining when a condition that a system other than the transmission satisfies the start-stop function activation condition is satisfied; and
    a first predetermined vehicle speed condition determination step of determining when a condition that the vehicle speed is equal to or lower than a first predetermined vehicle speed is satisfied, wherein
    when the condition is satisfied in the transmission condition determination step, the condition is satisfied in the system condition determination step, and the condition is satisfied in the first predetermined vehicle speed condition determination step, boosting of the line pressure is performed.

2. A hydraulic circuit device for a vehicle, comprising:
    a clutch to activate a start-stop function of the vehicle;
    a flow path connected to the clutch;
    a fluid pump connected to the flow path to supply oil to the flow path;
    a pressure generating device connected to the flow path to supply oil to the flow path when the fluid pump does not function; and
    a control valve connected to the flow path, the control valve being configured to
        determine when a transmission start-stop function activation condition other than a vehicle speed is satisfied,
        determine when a system start-stop function activation condition related to a component of the vehicle is satisfied, the component being other than the transmission,
        determine when the vehicle speed is equal to or lower than a first speed threshold, and
        boost a line pressure of the flow path to accumulate pressure in the pressure generating device for preparing activation of the start-stop function when it is determined that the transmission start-stop function activation condition and the system start-stop function activation condition are satisfied, and when it is determined that the vehicle speed is equal to or lower than the first speed threshold.

3. The hydraulic circuit device according to claim 2, wherein the pressure generating device is an accumulator.

4. A hydraulic circuit device for a vehicle, comprising:
    a clutch to activate a start-stop function of the vehicle;
    a flow path connected to the clutch;
    a fluid pump connected to the flow path to supply oil to the flow path;
    a pressure generating device connected to the flow path to supply oil to the flow path when the fluid pump does not function; and
    a control valve connected to the flow path, the control valve being configured to
        determine when a transmission start-stop function activation condition other than a vehicle speed is satisfied,
        determine when a system start-stop function activation condition related to a component of the vehicle is satisfied, the component being other than the transmission,
        determine when a second vehicle speed condition in which the vehicle speed increases to be larger than a second speed threshold before a first predetermined time elapses is satisfied, the second speed threshold being higher than a first speed threshold,
        determine when a first disablement condition in which the vehicle speed decreases to be less than or equal to the first speed threshold while the line pressure is boosted and a first predetermined time elapses is satisfied,
        determine when a second disablement condition in which the vehicle stops and a second predetermined period elapses is satisfied, and
        stop boosting a line pressure of the flow path to accumulate pressure in the pressure generating device for preparing for activation of the start-stop function when it is determined that the transmission start-stop function activation condition and the system start-stop function activation condition are satisfied, and when it is determined that at least one of the second vehicle speed condition, the first disablement condition, and the second disablement condition is satisfied.

5. The hydraulic circuit device according to claim 4, wherein the pressure generating device is an accumulator.

6. A hydraulic device for a vehicle, comprising:
    a clutch to activate a start-stop function of the vehicle;
    a flow path connected to the clutch;
    a fluid pump connected to the flow path to supply oil to the flow path;
    a pressure generating device connected to the flow path to supply oil to the flow path when the fluid pump does not function; and
    a control valve connected to the flow path, the control valve being configured to
        determine when a transmission start-stop function activation condition other than a vehicle speed is satisfied,
        determine when a system start-stop function activation condition related to a component of the vehicle is satisfied, the component being other than the transmission,
        determine when a first vehicle speed condition in which the vehicle speed is equal to or lower than a first speed threshold is satisfied, and
        stop boosting a line pressure of the flow path to accumulate pressure in the pressure generating device for preparing for activation of the start-stop function when it is determined that at least one of the transmission start-stop function activation condition, the system start-stop function activation condition, and the first vehicle speed condition is not satisfied.

7. The hydraulic circuit device according to claim 6, wherein the pressure generating device is an accumulator.

8. A line pressure boosting method for a hydraulic circuit in a vehicle, comprising:
- determining when a transmission start-stop function activation condition other than a vehicle speed is satisfied;
- determining when a system start-stop function activation condition related to a component of the vehicle is satisfied, the component being other than the transmission;
- determining when the vehicle speed is equal to or lower than a first speed threshold; and
- boosting a line pressure of the hydraulic circuit to accumulate pressure in a pressure generating device for preparing activation of a start-stop function of the vehicle when it is determined that the transmission start-stop function activation condition and the system start-stop function activation condition are satisfied, and when it is determined that the vehicle speed is equal to or lower than the first speed threshold.

9. The line pressure boosting method according to claim 8, wherein the pressure generating device is an accumulator.

10. A line pressure boosting method for a hydraulic circuit in a vehicle, comprising:
- determining when a transmission start-stop function activation condition other than a vehicle speed is satisfied;
- determining when a system start-stop function activation condition related to a component of the vehicle is satisfied, the component being other than the transmission;
- determining when a second vehicle speed condition in which the vehicle speed increases to be larger than a second speed threshold before a first predetermined time elapses is satisfied, the second speed threshold being higher than a first speed threshold;
- determining when a first disablement condition in which the vehicle speed decreases to be less than or equal to the first speed threshold while the line pressure is boosted and a first predetermined time elapses is satisfied;
- determining when a second disablement condition in which the vehicle stops and a second predetermined period elapses is satisfied; and
- stopping boosting a line pressure of the hydraulic circuit to accumulate pressure in a pressure generating device for preparing for activation of a start-stop function of the vehicle, when it is determined that the transmission start-stop function activation condition and the system start-stop function activation condition are satisfied, and when it is determined that at least one of the second vehicle speed condition, the first disablement condition, and the second disablement condition is satisfied.

11. The line pressure boosting method according to claim 10, wherein the pressure generating device is an accumulator.

12. A line pressure boosting method for a hydraulic circuit in a vehicle, comprising:
- determining when a transmission start-stop function activation condition other than a vehicle speed is satisfied;
- determining when a system start-stop function activation condition related to a component of the vehicle is satisfied, the component being other than the transmission;
- determining when a first vehicle speed condition in which the vehicle speed is equal to or lower than a first speed threshold is satisfied; and
- stopping boosting a line pressure of the hydraulic circuit to accumulate pressure in a pressure generating device for preparing activation of a start-stop function of the vehicle when it is determined that at least one of the transmission start-stop function activation condition, the system start-stop function activation condition, and the first vehicle speed condition is not satisfied.

13. The line pressure boosting method according to claim 12, wherein the pressure generating device is an accumulator.

* * * * *